United States Patent [19]

Saito

[11] Patent Number: 5,402,444

[45] Date of Patent: Mar. 28, 1995

[54] SYNCHRONOUS DATA INTERFACE CIRCUIT AND METHOD OF EQUALIZING SYNCHRONOUS DIGITAL DATA THEREFOR

[75] Inventor: Toshio Saito, Tokyo, Japan

[73] Assignee: NEC Corporation, Tokyo, Japan

[21] Appl. No.: 895,650

[22] Filed: Jun. 9, 1992

[30] Foreign Application Priority Data

Jun. 26, 1991 [JP] Japan .................................. 3-153607

[51] Int. Cl.6 ............................................. H03H 7/30
[52] U.S. Cl. ...................................... 375/229; 333/18; 375/377
[58] Field of Search ...................................... 375/11–16, 375/121, 38, 98; 333/18, 28 R; 364/724.19, 724.2; 360/65; 455/59, 235.1, 245.2, 247.1; 330/278

[56] References Cited

U.S. PATENT DOCUMENTS 4,811,423  3/1989  Eastmond ........................ 455/247.1
5,134,722  7/1992  Emslie et al. ........................ 375/98
5,163,066  11/1992  Cupo et al. ........................ 375/14

Primary Examiner—Stephen Chin
Assistant Examiner—Hai H. Phan
Attorney, Agent, or Firm—Foley & Lardner

[57] ABSTRACT

A synchronous data interface circuit which is reduced in scale and low in power consumption is provided. A bit clock amplitude detector measures the amplitude of a bit clock signal transmitted thereto through a signal line and outputs to a set of equalizers a signal representing a ratio corresponding to the measured amplitude. The equalizers also respectively receive an NRZ data signal, a frame signal and a bit clock signal on lines of the same length and made of the same material. The equalizers thus individually set equalizing amounts and compensate for amplitude distortion of the individual signals. In this instance, each equalizing amount is set in accordance with the signal received from the bit clock amplitude detector. Discriminators receive signals after this amplitude compensation and reproduce the original signals as output.

4 Claims, 1 Drawing Sheet

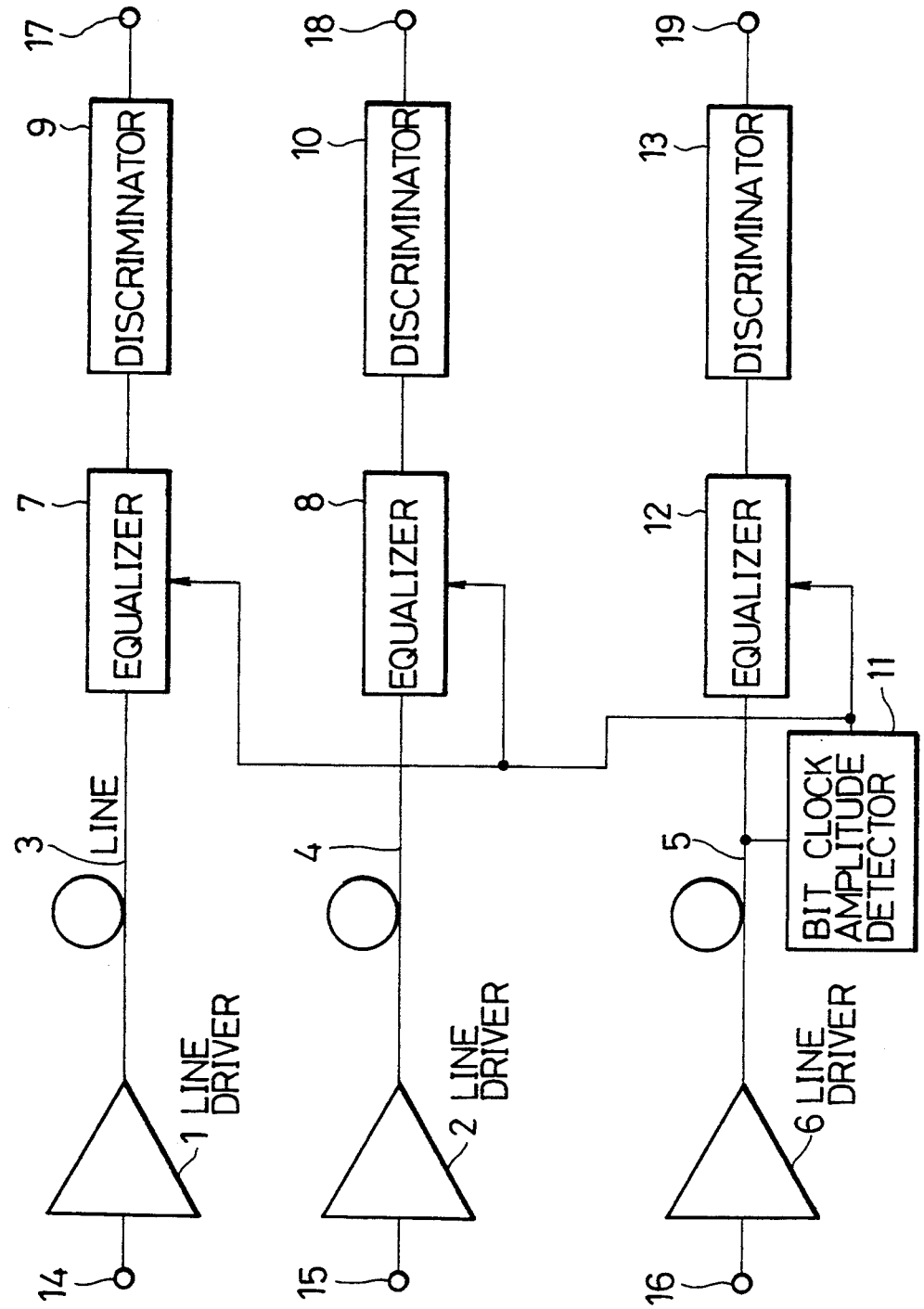

SYNCHRONOUS DATA INTERFACE CIRCUIT AND METHOD OF EQUALIZING SYNCHRONOUS DIGITAL DATA THEREFOR

BACKGROUND OF THE INVENTION

1. Field of the Invention

This invention relates to a method of equalizing synchronous digital data when such synchronous digital data are transmitted through lines of an arbitrary length and also to a synchronous data interface circuit to which the equalizing method is applied.

2. Description of Related Art

When a non-return to zero (NRZ) data signal is transmitted through a line of an arbitrary length, deterioration of the transmission characteristics, particularly of the amplitude distortion characteristic, of the line will cause distortion of the signal waveform, resulting in deterioration of the eye pattern at the signal receiving end of the line. Therefore, in order to minimize the deterioration represented by the eye pattern, conventional synchronous data interface circuits first pass a received NRZ data signal through an equalizer to compensate for amplitude distortion of the NRZ data signal, and then reproduce its original signal by a discriminator. Further, in order to receive a plurality of NRZ data signals, equalizers are provided for individual signal paths, and they perform compensating processing for amplitude distortion independently of each other.

In these conventional synchronous data interface circuits, since the equalizers operate independently of each other to compensate for amplitude distortion of data signals, each equalizing circuit is large in scale, and particularly when a plurality of NRZ data signal paths are provided, total volume of interface circuit becomes great in size and the power consumption is also high.

SUMMARY OF THE INVENTION

It is an object of the present invention to provide an equalizing method wherein synchronous digital data are processed in a simpler manner than by the conventional equalizing method wherein independent compensating processing is performed for each signal.

It is another object of the present invention to provide a synchronous data interface circuit which is small in scale and low in power consumption.

In order to attain the objects, the method of equalizing synchronous digital data according to one aspect of the present invention comprises steps for receiving one or more synchronous NRZ data signals, a bit clock signal and a frame synchronizing signal through each dedicated lines provided for the individual signals, detecting the amplitude of the received bit clock signal, and equalizing each of the received signals according to the detected value of the amplitude of the bit clock signal.

According to another aspect of the present invention, there is provided a synchronous data interface circuit which receives one or more synchronous NRZ data signals, a bit clock signal and a frame synchronizing signal through each dedicated lines provided for the individual signals, comprising the amplitude detector for detecting the amplitude of the bit clock signal received through the corresponding line, and a plurality of equalizers individually connected to receive each of the signals compensating for amplitude distortions of the received signals according to the result of the detection by the amplitude detector of the bit clock signal.

BRIEF DESCRIPTION OF THE DRAWING

FIG. 1 is a block diagram of a synchronous data interface circuit according to a preferred embodiment of the present invention.

DESCRIPTION OF THE PREFERRED EMBODIMENT

FIG. 1 is a synchronous data interface circuit according to a preferred embodiment of the present invention. The synchronous data interface circuit comprises three equalizers 7, 8 and 12, bit clock amplitude detector 11, and three discriminators 9, 10 and 13. The synchronous data interface circuit is connected to receive an NRZ data signal, a frame signal and a bit clock signal through lines 3, 4 and 5 respectively of arbitrary lengths. In particular, an NRZ data signal inputted in input terminal 14 is sent to line 3 through line driver 1 and inputted to the synchronous data interface circuit. Meanwhile, a frame signal and a bit clock signal inputted in terminals 15 and 16 are sent to lines 4 and 5 through line drivers 2 and 6, respectively, and then inputted to the interface circuit. It is to be noted that the lines 3, 4 and 5 have the same length and made of the same material.

Bit clock amplitude detector 11 of the synchronous data interface circuit measures the amplitude of a bit clock signal transmitted through line 5, calculates the ratio of the measured amplitude value to a predetermined value and sends the ratio signal representing the ratio to equalizers 7, 8 and 12. Equalizers 7, 8, 12 receive an NRZ data signal, a frame signal and a bit clock signal transmitted thereto through lines 3, 4 and 5, respectively, then individually set equalizing amounts and compensate for amplitude distortion of the individual signals. In this instance, each equalizing amount is set in accordance with the ratio signal from bit clock amplitude detector 11 such as to compensate a little amount when the value of the ratio represented by the ratio signal is low but much amount when the value of the ratio is high. Discriminators 9, 10 and 13 receive signals after this amplitude compensation from equalizers 7, 8 and 12, respectively, reproduce original signals and send the reproduced signals to terminals 17, 18 and 19, respectively.

In this manner, in the synchronous data interface circuit of the present embodiment, when an NRZ data signal and a frame signal are received through dedicated lines, the amplitude of the bit clock signal received through line 5 which is made of the same material and has the same length as lines 3, 4 is detected, and equalizers 7, 8 and 12 individually set equalizing amounts in accordance with the result of this detection of bit clock amplitude detector 11 and compensate for amplitude distortion of the signals. Accordingly, when compared with independent compensating processing as is employed in conventional synchronous data interface circuits, the processing performed by each equalizer and the construction of each equalizer are greatly simplified. Consequently, a synchronous data interface circuit is realized which is reduced in scale and in power consumption.

While the embodiment described above is constructed for the transmission of a single NRZ data signal, in order to transmit a plurality of NRZ data signals, the synchronous data interface circuit may be modified to add additional equalizers and discriminators corresponding to the number of additional NRZ data signals, and the ratio signal from detecting circuit 11 is also inputted to the additional equalizers.

Further, if a cable is employed for the lines, then the same lengths and materials of the lines for the transmission of signals can be achieved readily. Since a cable is usually employed particularly when a large number of data signals are to be transmitted, in this instance, the requirements for the lines are satisfied.

It is claimed:

1. A method of equalizing synchronous digital data, wherein said digital data comprises a synchronous non-return to zero (NRZ) data signal, a bit clock signal and a frame synchronizing signal, the method comprising the steps of:

transmitting the NRZ data signal at one end of a first line;

transmitting the bit clock signal at one end of a second line;

transmitting the frame synchronizing signal at one end of a third line, wherein the first line, the second line, and the third line are of a same length and made of a same material;

receiving the NRZ data signal at the other end of the first line;

receiving the bit clock signal at the other end of the second line;

receiving the frame synchronizing signal at the other end of the third line;

detecting the amplitude of the bit clock signal received on the second line; and separately equalizing the synchronous NRZ data signal, the bit clock signal, and the frame synchronizing signal in accordance with the detected amplitude of the bit clock signal received on the second line.

2. The method of claim 1, wherein the equalizing step separately equalizes the amplitudes of the synchronous NRZ data signal, the bit clock signal, and the frame synchronizing signal.

3. A synchronous data interface circuit which receives digital data, wherein the digital data comprises a synchronous non-return to zero (NRZ) data signal, a bit clock signal and a frame synchronizing signal, wherein the synchronous NRZ data signal is received through a first line, the bit clock signal is received through a second line, and the frame synchronizing signal is received through a third line, and wherein the first line, the second line and the third line are of a same length and are made of a same material, the synchronous data interface circuit comprising:

an amplitude detector for detecting the amplitude of the bit clock signal received through the second line, the amplitude detector comparing the detected amplitude with a predetermined value and outputting a signal indicative thereof; and three equalizers, respectively, connected to each of the first, second and third lines, the equalizers further being connected to the amplitude detector, the equalizers compensating amplitude distortions of the synchronous NRZ data signal received through the first line, the bit clock signal received through the second line, and the frame synchronizing signal received through the third line in accordance with the signal received from the amplitude detector.

4. The synchronous data interface circuit of claim 3, wherein the output of the amplitude detector is a ratio of the detected amplitude and the predetermined value.

* * * * *